(12) United States Patent
Rein

(10) Patent No.: US 11,559,907 B2
(45) Date of Patent: Jan. 24, 2023

(54) GRIPPING DEVICE FOR HANDLING SAMPLE CONTAINER CARRIERS AND ANALYTICAL INSTRUMENT

(71) Applicant: Roche Diagnostics Operations, Inc., Indianapolis, IN (US)

(72) Inventor: Michael Rein, Fellbach (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 285 days.

(21) Appl. No.: 16/885,719

(22) Filed: May 28, 2020

(65) Prior Publication Data

US 2020/0384655 A1 Dec. 10, 2020

(30) Foreign Application Priority Data

Jun. 5, 2019 (EM) .................................. 19178494

(51) Int. Cl.
*B25J 15/10* (2006.01)
*B25J 13/08* (2006.01)
*B25J 15/00* (2006.01)
*B25J 19/02* (2006.01)

(52) U.S. Cl.
CPC ............. *B25J 15/10* (2013.01); *B25J 13/084* (2013.01); *B25J 15/009* (2013.01); *B25J 15/0028* (2013.01); *B25J 15/0066* (2013.01); *B25J 19/021* (2013.01)

(58) Field of Classification Search
CPC ...... B25J 15/10; B25J 15/009; B25J 15/0028; B25J 15/0066; B25J 15/02; B25J 13/084; B25J 19/021; G01B 5/209; G01N 2035/0406; G01N 2035/0405; G01N 35/0099; B01L 9/06; B01L 3/5082
See application file for complete search history.

(56) References Cited

U.S. PATENT DOCUMENTS

| 6,203,760 | B1 | 3/2001 | van der Plaats et al. |
| 6,264,419 | B1* | 7/2001 | Schinzel ................. B25J 9/102 414/751.1 |
| 6,435,582 | B1* | 8/2002 | DaSilva ................. G01N 35/04 294/94 |
| 2004/0074320 | A1* | 4/2004 | Itoh .......................... B01L 9/50 73/864.91 |
| 2006/0248960 | A1 | 11/2006 | Liskow et al. |
| 2007/0134131 | A1 | 6/2007 | Watson et al. |

(Continued)

FOREIGN PATENT DOCUMENTS

| EP | 3444616 A1 | 2/2019 |
| EP | 3693139 A1 * | 8/2020 |

*Primary Examiner* — Stephen A Vu
(74) *Attorney, Agent, or Firm* — Roche Diagnostics Operations, Inc.

(57) ABSTRACT

A gripping device for handling sample containers is presented. The sample containers are closed by caps of a given cap type or are not closed by caps. The gripping device comprises a number of fingers configured to collectively cause gripping of a sample container, a tactile sensor device arranged at at least one of the fingers and configured to sample a longitudinal profile of the sample container and of the cap, if any, being gripped, and a control device coupled to the tactile sensor device. The control device determines if the sample container is closed by a cap or not closed by a cap based on the sampled longitudinal profile.

10 Claims, 3 Drawing Sheets

(56) References Cited

U.S. PATENT DOCUMENTS

| | | |
|---|---|---|
| 2009/0285664 A1 | 11/2009 | Kim et al. |
| 2010/0066109 A1* | 3/2010 | Pedrazzini ............. B25J 13/088 294/207 |
| 2011/0089709 A1 | 4/2011 | Neeper |
| 2014/0036276 A1 | 2/2014 | Gross et al. |
| 2015/0142171 A1* | 5/2015 | Li ........................ B25J 9/1692 700/251 |
| 2016/0018427 A1* | 1/2016 | Streibl ................ G01F 23/2921 702/19 |

* cited by examiner

GRIPPING DEVICE FOR HANDLING SAMPLE CONTAINER CARRIERS AND ANALYTICAL INSTRUMENT

CROSS-REFERENCE TO RELATED APPLICATIONS

This application is a continuation of EP 19178494.1, filed Jun. 5, 2019, which is hereby incorporated by reference.

BACKGROUND

The present disclosure generally relates to a gripping device for handling sample containers and to an analytical instrument.

There is a need for a gripping device for handling sample containers and to provide an analytical instrument that is highly flexible and performant.

SUMMARY

According to the present disclosure, a gripping device for handling sample containers is presented. The sample containers can be closed by caps of a given cap type or are not closed by caps. The gripping device can comprise a number of fingers configured to collectively cause gripping of a sample container, a tactile sensor device arranged at at least one of the number of fingers and configured to sample a longitudinal profile (LP) of the sample container and of the cap, if any, being gripped, and a control device coupled to the tactile sensor device. The control device can be configured to determine if the sample container is closed by a cap or not closed by a cap based on the sampled longitudinal profile (LP).

Accordingly, it is a feature of the embodiments of the present disclosure to provide for a gripping device for handling sample containers and to provide an analytical instrument that is highly flexible and performant. Other features of the embodiments of the present disclosure will be apparent in light of the description of the disclosure embodied herein.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
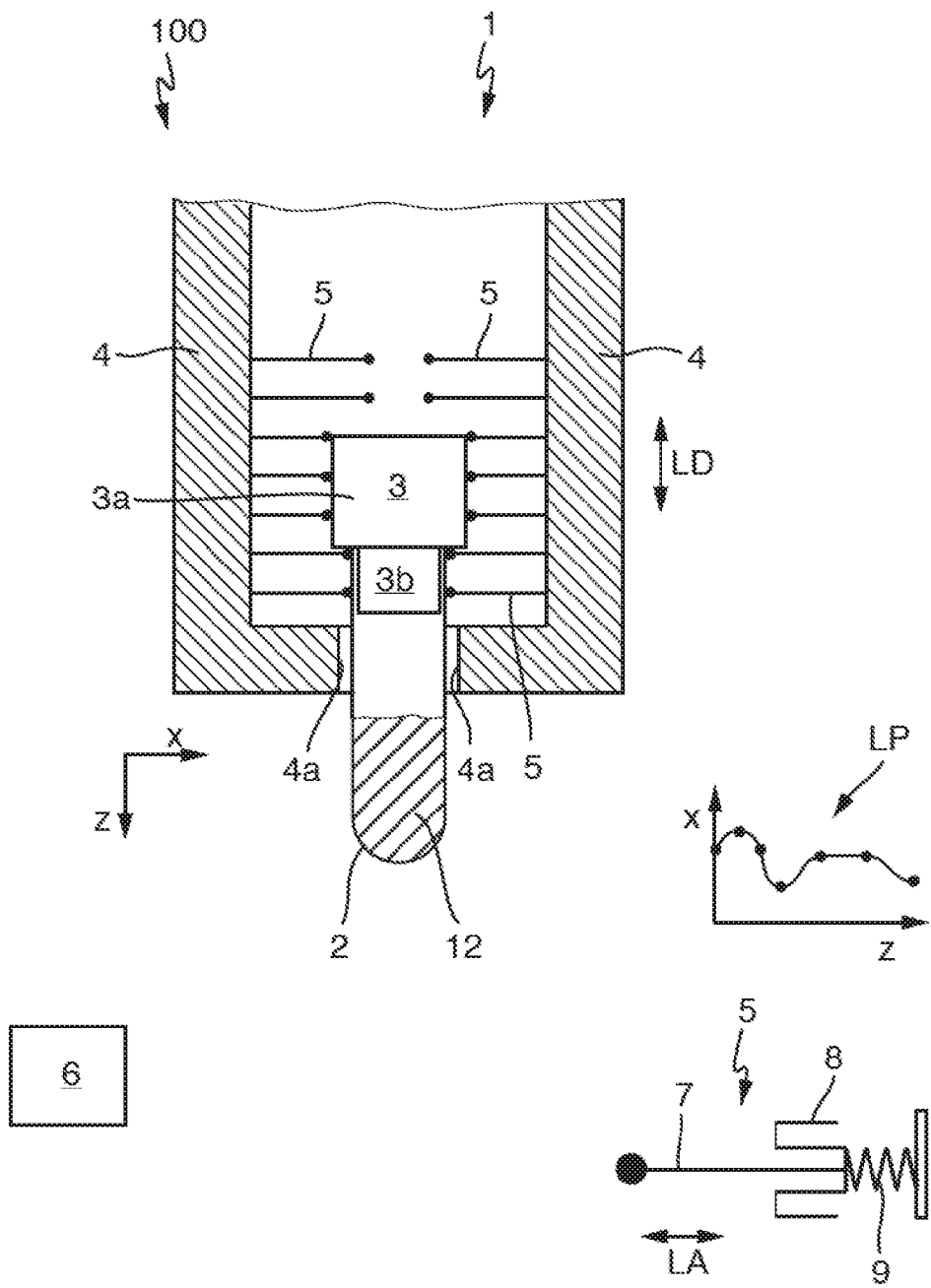
FIG. 1 illustrates a side view of an analytical instrument comprising a gripping device for handling sample containers according to an embodiment of the present disclosure.

In the following detailed description of the embodiments, reference is made to the accompanying drawings that form a part hereof, and in which are shown by way of illustration, and not by way of limitation, specific embodiments in which the disclosure may be practiced. It is to be understood that other embodiments may be utilized and that logical, mechanical and electrical changes may be made without departing from the spirit and scope of the present disclosure.

A gripping device is presented. The gripping device can be configured to handle sample containers, e.g. in the form of conventional sample tubes. The sample containers can be closed by caps of a given cap type or are not closed by caps. The cap type may be chosen from a set of different cap types. Different types of sample containers may e.g. be closed by different types of caps.

The gripping device can comprise a number of fingers configured to collectively grip a sample container and/or configured to cause gripping of a sample container.

The gripping device can further comprise a tactile sensor device arranged at and/or mechanically coupled to at least one of the fingers. The tactile sensor device can be configured to measure and/or sample a longitudinal profile of the sample container and of the cap, if any, being gripped. The longitudinal profile can be a profile in a longitudinal extension of the sample container.

The gripping device can further comprise a control device coupled to the tactile sensor device. The control device can be configured to determine if the sample container is closed by a cap or not closed by a cap based on the sampled longitudinal profile. The sampled longitudinal profile can depend if the sample container is closed by a cap or not. Typically, the part of the cap not being inserted into the sample container can have another diameter such as, for example, a larger diameter, than the sample container. Consequently, the sampled longitudinal profile can change specifically at the transition position between the sample container and the cap. Thus, the control device may e.g. evaluate the gradient of the sampled longitudinal profile to determine if a cap is present. Additionally or alternatively, the control device may compare the sampled longitudinal profile to stored longitudinal profiles of known sample containers with/without caps.

According to one embodiment, the tactile sensors device can comprise a number, e.g. between 2 and 100, of tactile sensors movable and arranged substantially longitudinally along at least one of the fingers to sample the longitudinal profile. The tactile sensors may be axially movable. The tactile sensors may be movable in a direction substantially perpendicular to a longitudinal axis of the sample container being gripped.

According to one embodiment, if the control device can determine that the sample container is closed by a cap, the control device can be further configured to determine the cap type such as, for example, based on the sampled longitudinal profile. Typically, the sampled longitudinal profile can be characteristic for the cap type. Thus, it can be possible to determine the cap type based on the sampled longitudinal profile. The control device may e.g. compare the sampled longitudinal profile to stored longitudinal profiles of known cap types. The control device may further use a sensed cap color to determine the cap type.

According to one embodiment, the cap can comprise a base portion to be inserted into the sample container. If the control device determines that the sample container is closed by a cap the control device can be further configured to determine an extent to which the base portion is inserted into the sample container based on the sampled longitudinal profile. Typically, the cap can comprise a base portion to be inserted into the sample container and an adjacent head portion having a larger diameter then the sample container. If the base portion is fully inserted into the sample container, the sampled profile can change between a value determined by the diameter of the sample container and a value determined by the head portion at the transition position between the sample container and the head portion. If the base portion is not fully inserted into the sample container, the sampled profile can change between a value determined by the diameter of the sample container, then a value determined by the diameter of the base portion and then a value determined by the head portion. Consequently, the length of the base portion not inserted into the sample container may be determined. Further, if the cap type is known, the geometrical properties of the cap can be known, e.g. the longitudinal extension of the base portion and of the head portion. Thus, the extent to which the base portion is inserted into the sample container can be computed based on the sampled longitudinal profile.

According to one embodiment, each of the number of tactile sensors can comprise a pin axially movable and a displacement measurement cell configured to measure an axial displacement of the axially movable pin. The longitudinal profile can be formed by the axial displacements of the tactile sensors.

According to one embodiment, the tactile sensors can be spring loaded such that the axially movable pin can be pressed against a surface of the sample container being gripped by the spring force.

According to an embodiment, the number of tactile sensors can be arranged substantially longitudinally along each one of the number of fingers. If, for example, the gripping device comprises two fingers, a number of tactile sensors can be arranged substantially longitudinally along the first finger and the same number of tactile sensors can be arranged substantially longitudinally along the second finger.

According to one embodiment, the number of fingers can be two.

According to one embodiment, the gripping device can further comprise a color sensor configured to sense a color of a cap, if any, being gripped. The control device may be configured to determine the cap type depending on the color of a cap.

An analytical instrument can comprise a gripping device as described above. The analytical instrument can typically comprise further components interacting with the gripping device such as, for example, a device for processing samples contained in the sample container, centrifuges, a device for aliquoting, and the like.

Referring initially to FIG. 1, FIG. 1 depicts schematically an analytical instrument 100 comprising a gripping device 1 for handling sample containers 2, wherein the sample containers 2 can be closed by caps 3 of a given cap type or may not be closed by caps.

The sample containers 2 can contain a laboratory sample 12 to be processed and/or analyzed such as, for example, a blood sample.

The analytical instrument may e.g. form a device for aliquoting.

The gripping device 1 can comprise two L-shaped fingers 4 configured to collectively grip a sample container 2 by corresponding gripping surfaces 4a, as depicted. The fingers 4 may be opened to release the sample container 2, see FIG. 2, or may be closed to grip the sample container 2, see FIG. 3.

The fingers 4 may be transferred/moved/rotated by a conventional drive mechanism not explicitly depicted such as, for example, in the form of an electric motor.

The gripping device 1 can further comprise a tactile sensor device comprising a number of tactile sensors 5 arranged longitudinally, i.e. in a longitudinal direction (LD), along the fingers 4 to sample a longitudinal profile LP of the sample container 2 and of the cap 3, if any, being gripped.

Each tactile sensor 5 can comprise a pin 7 movable along its longitudinal axis (LA). The pins 7 can be arranged such that the longitudinal axis of each pin can be substantially rectangular to a longitudinal axis of a sample container 2 being gripped.

Each tactile sensor 5 can further comprise a displacement measurement cell 8 configured to measure an axial displacement of the corresponding axially movable pin 7.

Each tactile sensor 5 can further comprise a spring 9 such that the axially movable pin 7 can be pushed against an outer surface of the sample container 2 being gripped.

The longitudinal profile (LP) may e.g. denote an axial displacement (a displacement in x direction, i.e. in the direction of the longitudinal axis LA) of the axially movable pin 7 depending on a longitudinal position z.

The gripping device 1 can further comprise a control device 6 coupled to the displacement measurement cells 8 of each tactile sensor 5 such that the control device 6 can read the longitudinal profile (LP). Based on the longitudinal profile (LP), the control device 6 can determine if the sample container 2 is closed by a cap 3 or not closed by a cap. Further, the control device 6 can determine the cap type based on the sampled longitudinal profile (LP).

Figure 2:
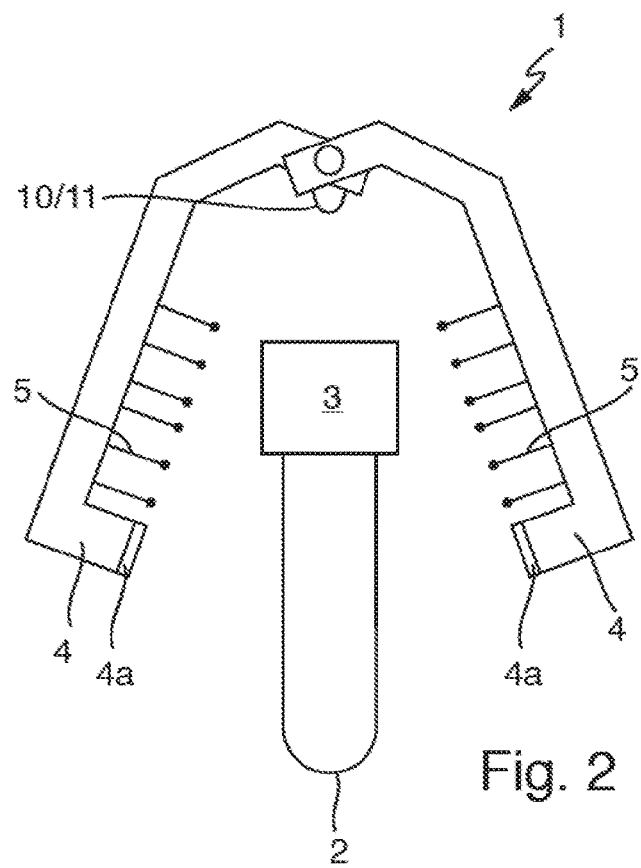
FIG. 2 illustrates a side view of the gripping device of FIG. 1 in an opened state according to an embodiment of the present disclosure.
Figure 3:
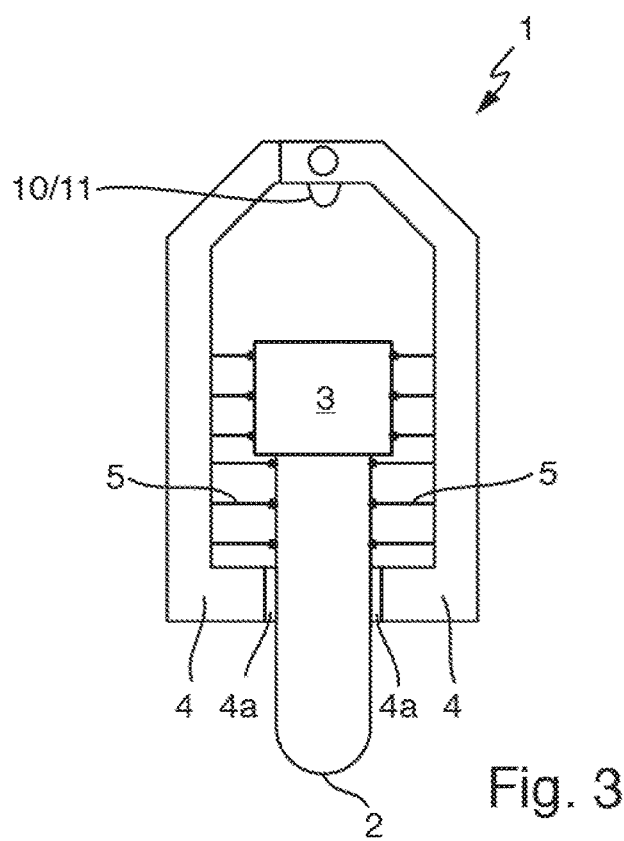
FIG. 3 illustrates a side view of the gripping device of FIG. 1 in a closed state according to an embodiment of the present disclosure.

Referring to FIGS. 2 and 3, the gripping device 1 can further comprise a color sensor 10 coupled to the control device 6 and configured to sense a color of a cap 3, if any, being gripped. The control device may determine a cap type and/or sample container type based on the color of the cap 3.

Referring to FIGS. 2 and 3, the gripping device 1 can further comprise an optional distance sensor 11 coupled to the control device 6 and configured to sense a distance to a cap 3, if any, being gripped. The control device may control the gripping operation based on the sensed distance.

Referring back to FIG. 1, the cap 3 can comprise a head portion 3a and a base portion 3b to be inserted into the sample container 2. If the control device 6 determines that the sample container 2 is closed by a cap 3, the control device 6 can determine an extent to which the base portion 3b is inserted into the sample container 2 based on the sampled longitudinal profile (LP).

Figure 4:
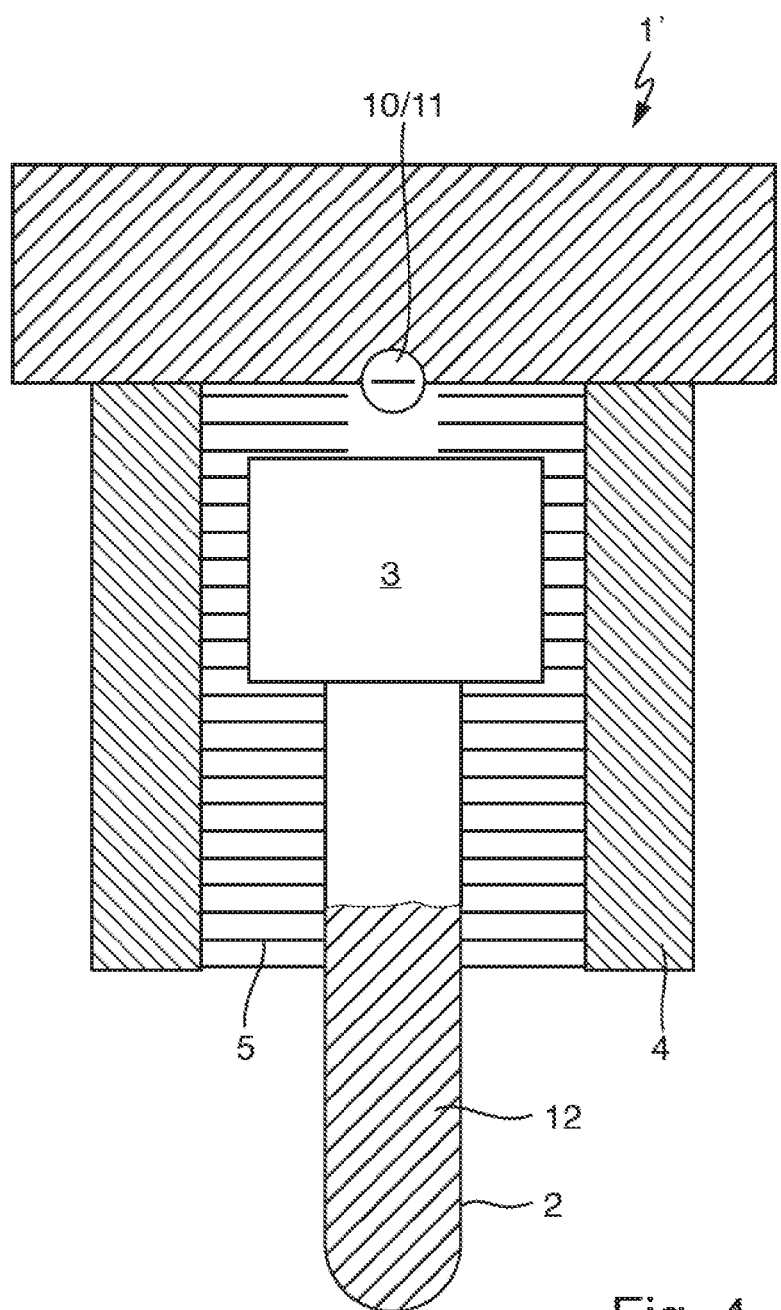
FIG. 4 illustrates a side view of a gripping device for handling sample containers according to another embodiment of the present disclosure.

FIG. 4 depicts a gripping device 1' for handling sample containers 2 according to a further embodiment.

The gripping device 1' can comprise two I-shaped fingers 4 and can grip the sample container 2 by the spring-loaded tactile sensors 5. The gripping device 1 depicted in FIG. 1 can grip the sample container 2 by the gripping surfaces 4a of the fingers 4.

Regarding the remaining features, reference is made to the description with regard to the embodiment depicted in FIGS. 1-3.

The gripping device 1/1' can determine cap presence, cap type, the extent of the cap inserted into the sample container, sample container diameter and cap color while handling the sample container.

The gripping device 1/1' can comprise a tactile/mechanical sensor on fingers 4 including axially movable pins 7.

Each axially movable pin 7 can be independently responsive to the surface of the sample container 2 handled/gripped by the gripping device 1/1'.

Displacement measurement cells 8 can map the axial position of each pin 7 to generate a longitudinal profile (LP) of the cap 3 and of the sample container 2.

This profile information LP can be used to classify the type of cap 3 and the extent the cap 3 is inserted within the sample container 2.

If the insertion of the cap 3 is unstable, the axially movable pins 7 can hold/fix the cap 3 in place during transport/handling.

An additional color sensor 10 may also be integrated within gripping device 1 for cap color determination.

It is noted that terms like "preferably," "commonly," and "typically" are not utilized herein to limit the scope of the claimed embodiments or to imply that certain features are critical, essential, or even important to the structure or function of the claimed embodiments. Rather, these terms are merely intended to highlight alternative or additional features that may or may not be utilized in a particular embodiment of the present disclosure.

For the purposes of describing and defining the present disclosure, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the present disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

I claim:

1. A gripping device for handling sample containers, wherein the sample containers are closed by caps of a given cap type or are not closed by caps, the gripping device comprising:
    a number of fingers configured to collectively cause gripping of a sample container;
    a tactile sensor device arranged at and/or mechanically coupled to at least one of the number of fingers and configured to sample a longitudinal profile (LP) of the sample container and of the cap, if any, being gripped, wherein the tactile sensor device comprises a number of tactile sensors arranged longitudinally along at least one of the fingers to sample the longitudinal profile (LP), and wherein each tactile sensor comprises an axially movable pin and a displacement measurement cell configured to measure an axial displacement of the axially movable pin; and
    a control device coupled to the tactile sensor device, wherein the control device is configured to determine if the sample container is closed by a cap or not closed by a cap based on the sampled longitudinal profile (LP).

2. The gripping device according to claim 1, wherein if the control device determines that the sample container is closed by a cap, the control device is further configured to determine the cap type.

3. The gripping device according to claim 2, wherein the control device determines the cap type based on the sampled longitudinal profile (LP).

4. The gripping device according to claim 1, wherein the cap comprises a base portion to be inserted into the sample container.

5. The gripping device according to claim 4, wherein if the control device determines that the sample container is closed by a cap, the control device is further configured to determine an extent to which the base portion is inserted into the sample container based on the sampled longitudinal profile (LP).

6. The gripping device according to claim 1, wherein the tactile sensors are spring loaded.

7. The gripping device according to claim 1, wherein the number of tactile sensors is arranged longitudinally along each one of the number of fingers.

8. The gripping device according to claim 1, wherein the number of fingers is two.

9. The gripping device according to claim 1, further comprises, a color sensor configured to sense a color of a cap, if any, being gripped.

10. An analytical instrument, the analytical instrument comprising:
    a gripping device according to claim 1.

* * * * *